(12) United States Patent
Onuma et al.

(10) Patent No.: US 6,892,600 B2
(45) Date of Patent: May 17, 2005

(54) CHANGING SYSTEM IN MANUAL TRANSMISSION

(75) Inventors: Yasushi Onuma, Wako (JP); Kiyokazu Okubo, Wako (JP); Atsuhiro Sakai, Wako (JP); Keiji Nemoto, Wako (JP); Takayuki Yakou, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 130 days.

(21) Appl. No.: 10/178,892

(22) Filed: Jun. 25, 2002

(65) Prior Publication Data

US 2003/0029264 A1 Feb. 13, 2003

(30) Foreign Application Priority Data

Jun. 29, 2001 (JP) .......................... 2001-198481
Jun. 29, 2001 (JP) .......................... 2001-198482

(51) Int. Cl.[7] ............................................. F16H 63/36
(52) U.S. Cl. ................................ 74/473.24; 74/473.25
(58) Field of Search ....................... 74/473.22, 473.24, 74/473.25

(56) References Cited

U.S. PATENT DOCUMENTS 4,377,951 A * 3/1983 Magg et al. .............. 74/473.28
4,493,403 A * 1/1985 Takano et al. ............ 74/473.24
4,510,819 A * 4/1985 Inui ........................ 74/473.22

FOREIGN PATENT DOCUMENTS

JP         2001-116142         4/2001

* cited by examiner

Primary Examiner—William C. Joyce
(74) Attorney, Agent, or Firm—Westerman, Hattori, Daniels & Adrian, LLP

(57) ABSTRACT

A changing system in a manual transmission is provided. An interlock plate is mounted on a shift-selecting shaft capable of being moved axially in response to a selecting operation and turned about an axis in response to a shifting operation, so that the interlock plate cannot be turned about an axis of the shift-selecting shaft. The interlock plate has a pair of side plate portions which are provided at locations spaced apart from each other in an axial direction of the shift-selecting shaft and through which the shift-selecting shaft extends. A shifting arm disposed between the side plate portions is fixed to the shift-selecting shaft. In such changing system, the shifting arm and an interlock member operatively connected to the shifting arm are interposed between the side plate portions of the interlock plate. Thus, the shifting arm can be used commonly in manual transmissions, in despite of a difference in number of forward speed stages between the manual transmissions, thereby providing a reduction in cost and avoiding an increase in weight due to a variation in number of forward speed stages.

6 Claims, 15 Drawing Sheets

CHANGING SYSTEM IN MANUAL TRANSMISSION

BACKGROUND OF THE INVENTION

1. Field of the Invention

The present invention relates to a changing system in a manual transmission in which an interlock plate is mounted on a shift-selecting shaft capable of being moved axially in response to a selecting operation and turned about an axis in response to a shifting operation, so that the interlock plate cannot be turned about the axis of the shift-selecting shaft, the interlock plate having a pair of side plate portions which are provided at locations spaced apart from each other in the direction of the axis of the shift-selecting shaft and through which the shift-selecting shaft extends, and a shifting arm disposed between the side plate portions is fixed to the shift-selecting shaft.

2. Description of the Related Art

Such a system is conventionally known, for example, from Japanese Patent Application Laid-open No. 2001-116142.

In a changing system in a manual transmission having five forward speed stages, a mis-operation preventing reverse locking cam is provided on a shifting arm for preventing the shifting from a fifth speed stage to a reverse speed stage from being conducted directly. On the other hand, in a changing system in a manual transmission having six forward speed stages, there is not a possibility that the shifting from a six speed stage to a reverse speed stage is conducted directly and hence, it is not required that the mis-operation preventing reverse locking cam is provided on the shifting arm. It is a conventional practice that the shape of the shifting arm is greatly varied depending on the number of forward speed stages, or the shifting arm is used commonly with the mis-operation preventing reverse locking cam left as an unnecessary portion in the manual transmission having the six forward speed stages.

In the conventional approach as described above depending on a difference in number of the forward speed stages, there is a possibility that an increase in manufacture cost is brought about, and an increase in weight of the transmission is also brought about due to the remaining unnecessary portion.

SUMMARY OF THE INVENTION

Accordingly, it is an object of the present invention to provide a changing system in a manual transmission, wherein the shifting arm is used commonly irrespective of a difference in number of forward speed stages, thereby providing a reduction in cost and preventing an increase in weight due to the variation in number of forward speed stages.

To achieve the above object, according to a first aspect and feature of the present invention, there is provided a changing system in a manual transmission in which an interlock plate is mounted on a shift-selecting shaft capable of being moved axially in response to a selecting operation and turned about an axis in response to a shifting operation, so that the interlock plate cannot be turned about the axis of the shift-selecting shaft, the interlock plate having a pair of side plate portions which are provided at locations spaced apart from each other in the direction of the axis of the shift-selecting shaft and through which the shift-selecting shaft extends, and a shifting arm disposed between the side plate portions is fixed to the shift-selecting shaft, wherein a shifting arm and an interlock member operatively connected to the shifting arm are interposed between the side plate portions of the interlock plate.

With such arrangement of the first feature, a reduction in cost can be provided by using the shifting arm commonly in changing systems in a plurality of manual transmissions having different numbers of forward speed stages. Moreover, the interlock member is selected and operatively connected to the shifting arm. Therefore, it is possible to prevent an increase in weight due to an unnecessary portion left in the shifting arm, by ensuring that a function required for the shifting arm in such a manner that it is varied depending on the number of forward speed stages, is performed by the interlock member.

According to a second aspect and feature of the present invention, in addition to the first feature, as said interlock member, a first interlock member operated to establish a reverse speed stage and a second interlock member functioning to prevent the turning of the shifting arm from a forward highest-speed stage to the reverse speed stage are selected and one of said first and second interlock member is selected alternatively depending on the number of forward speed stages in such a manner that the first interlock member is selected when the number of forward speed stages is an even number, and the second interlock member is selected when the number of forward speed stages is an odd number. With such arrangement, the interlock member can be selected appropriately in any of the changing systems in the manual transmissions having the even number of forward speed stages and the odd number of forward speed stages, and a satisfactory function can be exhibited in each of the changing systems.

According to a third aspect and feature of the present invention, in addition to the second feature, a plurality of shifting pieces are disposed in parallel in a direction along the axis of the shift-selecting shaft and capable of being alternatively brought into engagement with the shifting arm depending on the selecting operation, and the first interlock member is operatively connected to the shifting arm in such a manner that preselected one of the forward speed stage shifting pieces is driven by a predetermined amount at an initial stage of a shifting operation to a reverse position and returned to an original position at a final stage of the shifting operation. With such arrangement, when the shifting arm is driven toward the reverse position in order to establish the reverse speed stage, the preselected forward speed stage shifting piece is driven by the predetermined amount at the initial stage of the shifting operation by the first interlock member operated in operative association with the shifting arm, and hence, a main shaft is braked as when a predetermined forward speed stage is established, and the braking of the main shaft is released at a final stage of the shifting operation. Therefore, an exclusive mechanism for the reverse speed stage is not required, and the main shaft can be braked temporarily during establishment of the reverse speed stage to prevent the generation of a gear chattering. Additionally, it is possible to provide the compactness of the manual transmission in a direction along an axis of the main shaft and to provide a reduction in weight of the manual transmission by a value corresponding to that the exclusive mechanism is not required.

According to a fourth aspect and feature of the present invention, in addition to the third feature, the interlock plate capable of being moved in the axial direction of the shift-selecting shaft and incapable of being turned about an axis is mounted to the shift-selecting shaft to cover a portion of the interlock arm and a portion of said first interlock member, and the interlock plate is provided with a recess adapted to accommodate a portion of the preselected forward speed stage shifting piece driven by the predetermined amount at the initial stage of the shifting operation. With such arrangement, the braking of the main shaft can be achieved reliably by ensuring that the preselected forward speed stage shifting piece is operated reliably by the predetermined amount during the establishment of the reverse speed stage.

The above and other objects, features and advantages of the invention will become apparent from the following description of the preferred embodiment taken in conjunction with the accompanying drawings.

BRIEF DESCRIPTION OF THE DRAWINGS

FIGS. 1 to 15 show an embodiment of the present invention. FIG. 1 is a vertical sectional view of a manual transmission for a vehicle having six forward speed stages;

FIG. 2 is a diagram showing a changing pattern for a change lever;

FIG. 3 is a cross-sectional view of essential portions of the manual transmission for the vehicle;

FIG. 4 is a vertical sectional view of essential portions of the manual transmission for the vehicle, taken along a line 4—4 in FIG. 3;

FIG. 5 is a side view of an interlock plate, a shifting arm and an interlock arm;

FIG. 6 is a perspective view of the interlock plate, the shifting arm and the interlock arm;

FIG. 7 is a sectional view taken along a line 7—7 in FIG. 5, showing a relationship between the interlock plate and a third/fourth-speed shifting piece;

FIG. 15 is a side view showing the interlock plate, the shifting arm and the interlock arm in correspondence to FIG. 5, when the changing system is utilized in a manual transmission having five forward speed stages.

DESCRIPTION OF THE PREFERRED EMBODIMENT

Figure 1:
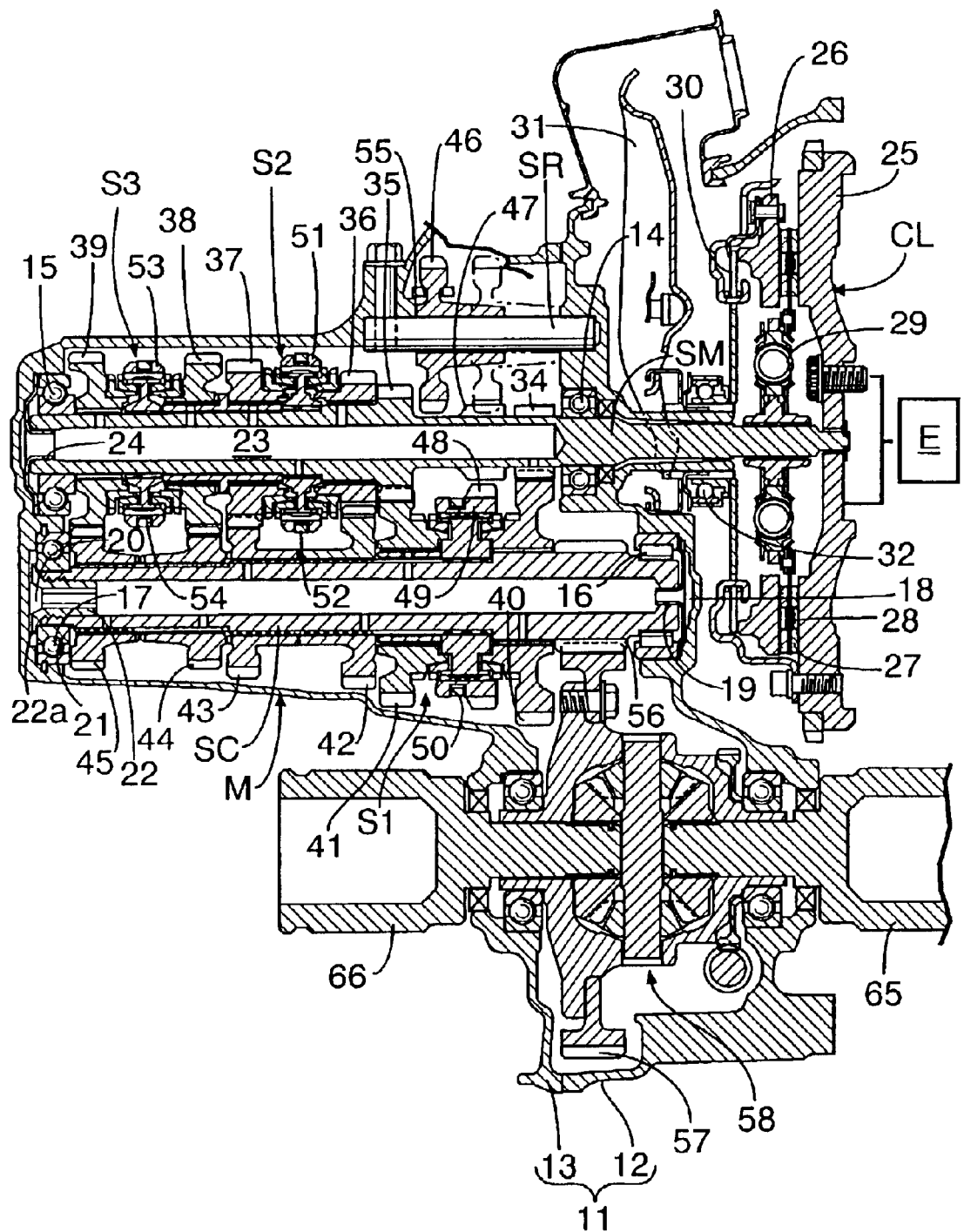

The present invention will now be described by way of an embodiment with reference to FIGS. 1 to 15. Referring first to FIG. 1, a transmission case 11 of a manual transmission M for a vehicle having an even number of, e.g., six forward speed stages and one backward speed stage, is comprised of a right case half 12 and a left case half 13 separated from each other at a split surface extending in a longitudinal direction of a vehicle body. An engine E is connected to one end of a main shaft SM through a shifting clutch CL. The main shaft SM is rotatably supported on the right and left case halves 12 and 13 with ball bearings 14 and 15 interposed therebetween. A counter shaft SC parallel to the main shaft SM is rotatably supported at its axially one end to the right case half 12 through a roller bearing 16, and at the axially other end to the left case half 13 through a ball bearing 17.

The counter shaft SC is formed into a cylindrical shape, so that a lubricating oil can flow through the counter shaft SC. A guide member 19 is mounted at one end of the counter shaft SC for guiding the oil from an oil passage 18 defined in the right case half 12 into the counter shaft SC. An oil passage 20 is defined in the left case half 13 to communicate with the other end of the counter shaft SC, and a bolt 22 is threadedly engaged into the left case half 13 and has a collar 22a clamping an inner race of the ball bearing 17 between the collar 22a itself and a step 21 formed on an outer periphery of the other end of the counter shaft SC. The cylindrical bolt 22 for flowing of the lubricating oil therethrough is screwed into an inner periphery of the other end of the counter shaft SC in order to fix the inner race of the ball bearing 17, whereby a distance between the other end of the counter shaft SC and the left case half 13 can be set at a small value, and a reduction in size of the transmission case 11 can be achieved. Further, an oil passage 23 is coaxially provided in the main shaft SM with one end closed and with the other end opening into the other end of the main shaft SM. A guide member 24 for guiding the oil from the oil passage 20 in the left case half 13 into the oil passage 23 is mounted at the other end of the main shaft SM.

The shifting clutch CL includes a clutch wheel 25 fixedly connected to a crankshaft of the engine E, a pusher plate 26 disposed on one side of the clutch wheel 25, a clutch disk 28 which has facings 27, 27 on opposite surfaces thereof and which is interposed between the clutch wheel 25 and the pusher plate 26 and connected to the main shaft SM through a damper 29, and a diaphragm spring 30 for biasing the pusher plate 26 in a direction to clamp the facings 27, 27 between the clutch wheel 25 and the pusher plate 26. In a usual state of the shifting clutch CL, the crankshaft 25 and the main shaft SM are connected to each other by clamping the facings 27, 27 between the clutch wheel 25 and the pusher plate 26 by the repulsing force of the diaphragm spring 30. In the shifting conducted by the shifting clutch, the crankshaft and the main shaft SM are disconnected from each other by operating a release bearing 32 leftwards as viewed in FIG. 1 by a release fork 31.

A main first-speed gear 34 and a main second-speed gear 35 are fixedly mounted on the main shaft SM, and a main third-speed gear 36, a main fourth-speed gear 37, a main fifth-speed gear 38 and a main sixth-speed gear 39 are relatively rotatably supported on the main shaft SM. On the other hand, a counter first-speed gear 40 and a counter second-speed gear 41 are relatively supported on the counter shaft SC and meshed with the main first-speed gear 34 and the main second-speed gear 35, respectively. A counter third-speed gear 42, a counter fourth-speed gear 43, a counter fifth-speed gear 44 and a counter sixth-speed gear 45 are fixedly mounted on the counter shaft SC and meshed with the main third-speed gear 36, the main fourth-speed gear 37, the main fifth-speed gear 38 and the main sixth-speed gear 39.

A reverse idling shaft SR parallel to the main shaft SM and the counter shaft SC is fixedly supported at its opposite ends on the right and left case halves 12 and 13. A reverse idling gear 46 slidably supported on the reverse idling shaft SR can be meshed simultaneously with a main reverse gear 47 fixedly mounted on the main shaft SM and a counter reverse gear 48 relatively non-rotatably supported on the counter shaft SC.

A first/second-speed synchronizing mechanism S1 mounted on the counter shaft SC includes a sleeve 49 which is movable in a range limited in an axial direction of the counter shaft SC and which is non-rotatable relative to the counter shaft SC. Any of the counter first-speed gear 40 and the counter second-speed gear 31 can be selected alternatively and coupled to the counter shaft SC by operating a first/second-speed shifting fork 50 retaining the sleeve 49 leftwards or rightwards as viewed in FIG. 1. More specifically, when the sleeve 49 is moved rightwards as viewed in FIG. 1, the counter first-speed gear 40 is coupled to the counter shaft SC, thereby establishing a first speed stage. When the sleeve 49 is moved leftwards as viewed in FIG. 1, the counter second-speed gear 41 is coupled to the counter shaft SC, thereby establishing a second shift stage. The counter reverse gear 48 is integrally formed on the sleeve 49.

A third/fourth speed synchronizing mechanism S2 mounted on the main shaft SM includes a sleeve 51 which is movable in a range limited in an axial direction of the main shaft SM and which is non-rotatable relative to the main shaft SM, so that any of the main third-speed gear 36 and the main fourth-speed gear 37 can be selected alternatively and coupled to the main shaft SM by operating a third/fourth-speed shifting fork 52 retaining the sleeve 51 leftwards or rightwards as viewed in FIG. 1. More specifically, when the sleeve 51 is moved rightwards as viewed in FIG. 1, the main third-speed gear 36 is coupled to the main shaft SM, thereby establishing a third shift stage.

When the sleeve 51 is moved leftwards as viewed in FIG. 1, the main fourth-speed gear 37 is coupled to the main shaft SM, thereby establishing a fourth speed stage.

A fifth/sixth-speed synchronizing mechanism S3 mounted on the main shaft SM includes a sleeve 53 which is movable in a range limited in the axial direction of the main shaft SM and which is non-rotatable relative to the main shaft SM, so that any of the main fifth-speed gear 38 and the main sixth-speed gear 39 can be selected alternatively and coupled to the main shaft SM by operating a fifth/sixth-speed shifting fork 54 retaining the sleeve 53 leftwards or rightwards as viewed in FIG. 1. More specifically, when the sleeve 53 is moved rightwards as viewed in FIG. 1, the main fifth-speed gear 38 is coupled to the main shaft SM, thereby establishing a fifth speed stage. When the sleeve 53 is moved leftwards as viewed in FIG. 1, the main sixth-shift gear 39 is coupled to the main shaft SM, thereby establishing a sixth speed stage.

The reverse idling gear 46 is rotatably retained on a reverse shifting fork 55, so that it can be meshed with the main reverse gear 47 and the counter reverse gear 48 by sliding the reverse idling gear 46 from a position shown by a solid line in FIG. 1 to a position shown by a dashed line in FIG. 1 by the reverse shifting form 55, thereby establishing a reverse speed stage.

When one of the first to sixth speed stages and the reverse speed stage is established selectively in the above-described manner, the rotation of the counter shaft SC is transmitted to a differential 58 through a final driving gear 56 and a final driven gear 57 and further to a right axle 65 and a left axle 66 from the differential 58.

Figure 2:
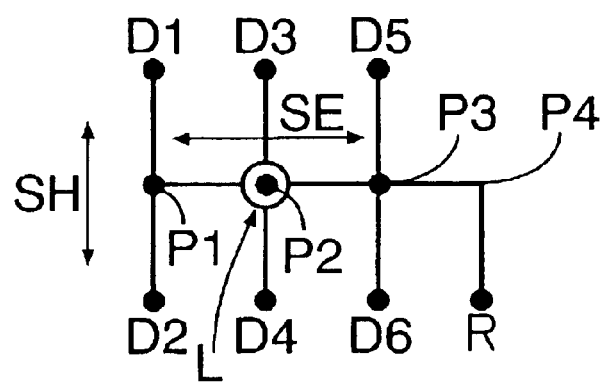

A change lever L of a changing system for selectively establishing one of the first to sixth speed stages and the reverse speed stage is operated in an operating pattern shown in FIG. 2, so that the change lever L can be moved to any of a first/second-speed selecting position P1, a third/fourth-speed selecting position P2, a fifth/sixth-speed selecting position P3 and a reverse selecting position P4 by operating the change lever L in a selecting direction shown by SE. In addition, any of a first-speed position D1 and a second-speed position D2 can be selected by operating the change lever L in a shifting direction SH perpendicular to the selecting direction SE in the first/second-speed selecting position P1. Any of a third-speed position D3 and a fourth-speed position D4 can be selected by operating the change lever L in the shifting direction SH in the third/fourth-speed selecting position P2. Any of a fifth-speed position D5 and a sixth-speed position D6 can be selected by operating the change lever L in the shifting direction SH in the fifth/sixth-speed selecting position P3. Further, a reverse position R can be selected by operating the change lever L in the shifting direction SH in the reverse selecting position P4.

Figure 3:
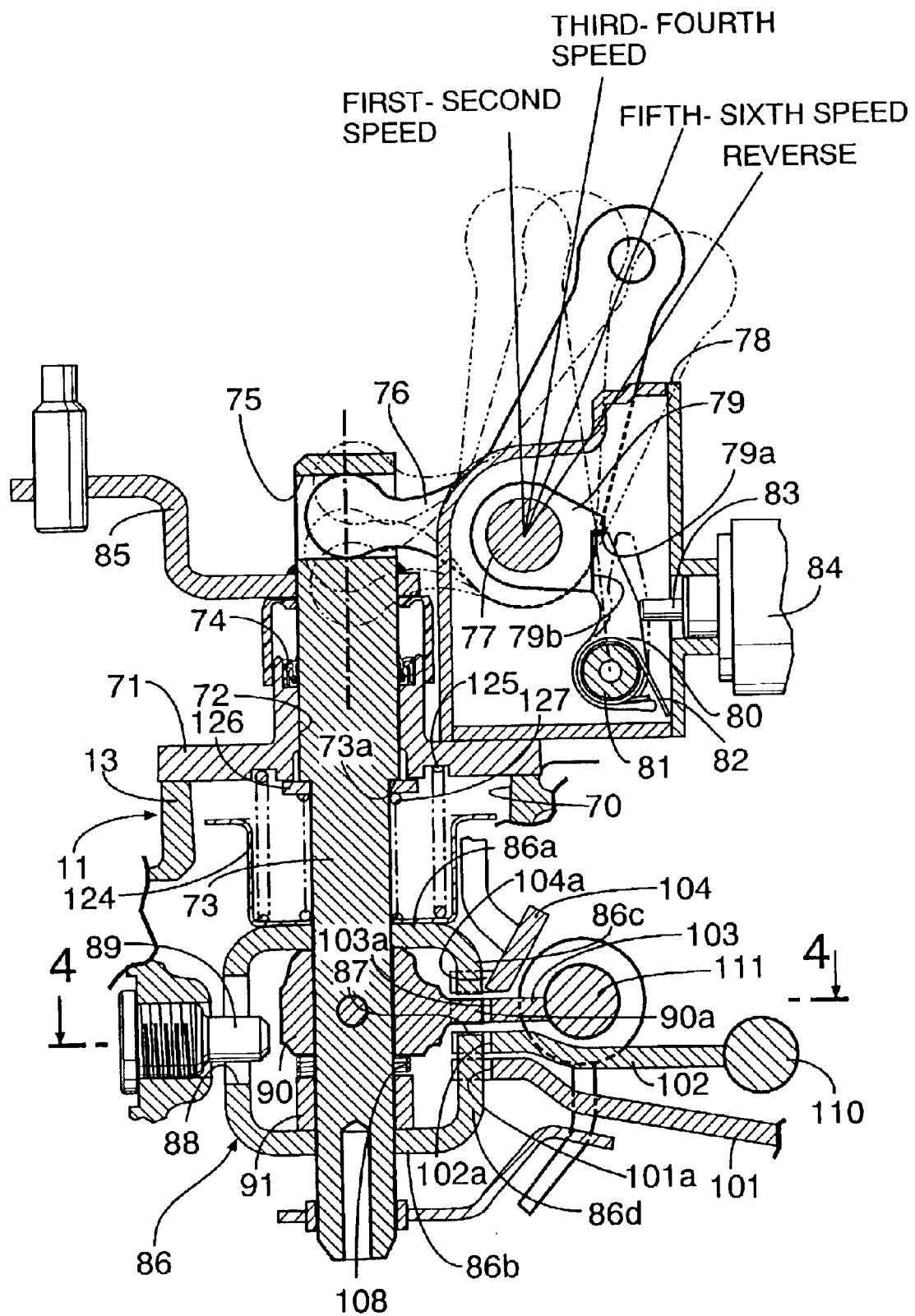
Figure 4:
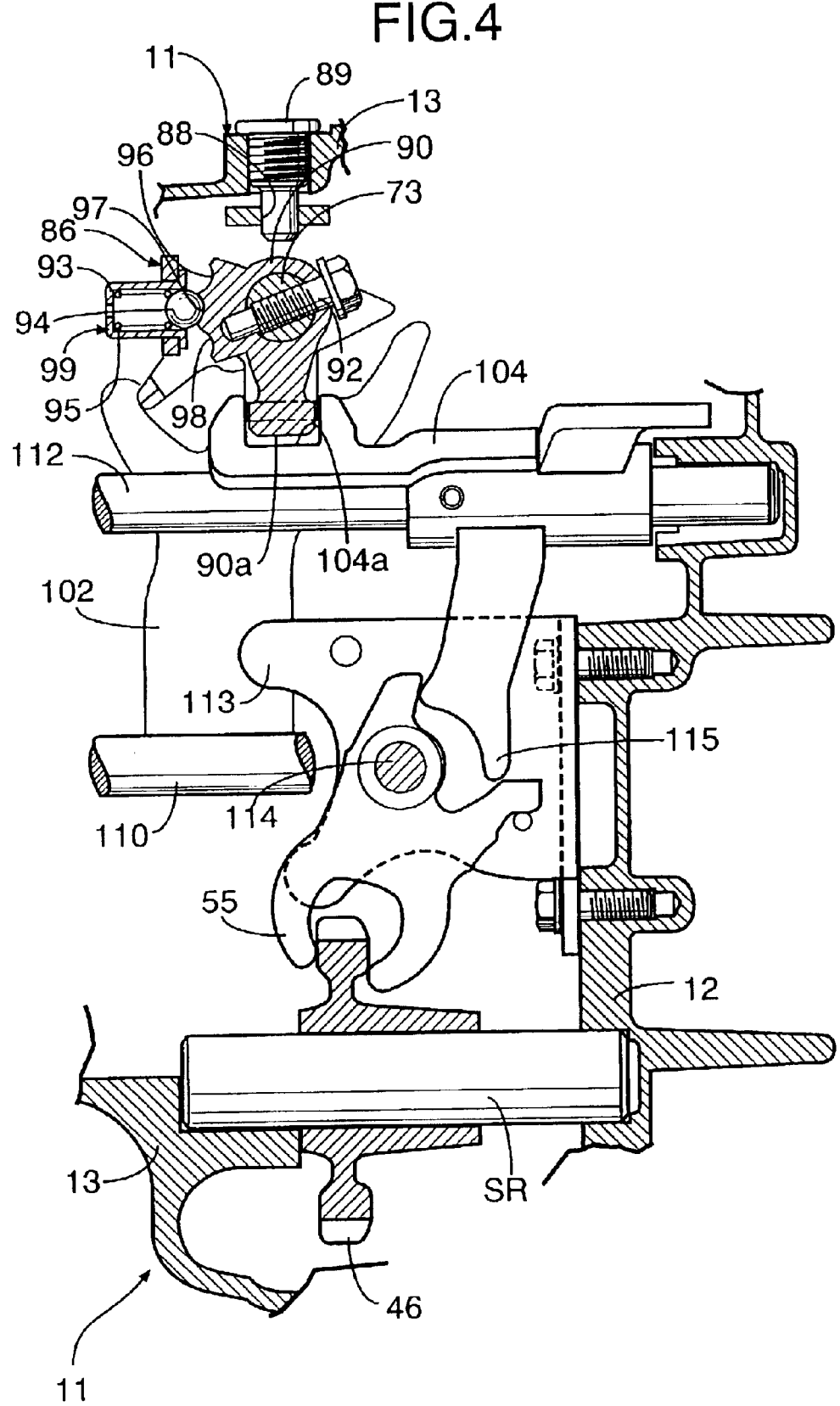

Referring to FIGS. 3 and 4, a cover member 71 is coupled to an upper portion of the left case half 13 in the transmission case 11 to cover an opening 70 provided in the left case half 13, and a guide bore 72 is provided in a central portion of the cover member 71. An upper portion of a shift-selecting shaft 73 is fitted into the guide bore 72 to protrude upwards from a cover plate 71, so that the shift-selecting shaft 73 can be turned about its axis and slid in an axial direction. A seal member 74 is interposed between the cover member 71 and the shift-selecting shaft 73.

An engagement bore 75 is provided in the shift-selecting shaft 73 at a portion protruding upwards from the cover member 71, and a selecting lever 76 is engaged in the engagement bore 75. The selecting lever 76 is secured to a turning shaft 77 extending in a direction perpendicular to the axis of the shift-selecting shaft 73. The turning shaft 77 is turnably supported on a casing 78 fixedly mounted on the cover member 71.

The selecting lever 76 is turned in response to the operation of the change lever L in the selecting direction SE (see FIG. 2). The selecting lever 76 is turned to any of the first/second-speed selecting position P1, the third/fourth-speed selecting position P2, the fifth/sixth-speed selecting position P3 and the reverse selecting position P4, as shown in FIG. 3, by the movement of the change lever L to any of the first/second-speed selecting position P1, the third/fourth-speed selecting position P2, the fifth/sixth-speed selecting position P3 and the reverse selecting position P4. The shift-selecting shaft 73 is also moved linearly in a direction of its axis in response to the turning of the selecting lever 76.

A first cam 79 is fixed to the turning shaft 77 within the casing 78, and a second cam 80 having an axis parallel to the turning shaft 77 is fixedly provided on a shaft 81 which is turnably supported in the casing 78 and is meshed with the first cam 79. A first flat abutment face 79a and a second abutment face 79b leading to the first abutment 79a at a right angle are formed on the first cam 79 to face the second cam 80. The first flat abutment face 79a is adapted to perpendicularly intersect a plane including the axis of the shaft 81, when the turned position of the selecting lever 76 turned in unison with the turning shaft 77 is the fifth/sixth-speed selecting position. The second cam 80 is formed, so that it can be brought into abutment against and in engagement with the first and second abutment faces 79a and 79b of the first cam 79, when the turned position of the selecting lever 76 is the fifth/sixth-speed selecting position.

A solenoid 84 is mounted to the casing 78 and has an axis which is substantially parallel to the first abutment face 79a of the first cam 79, when the turned position of the selecting lever 76 is the fifth/sixth-speed selecting position. The solenoid 84 includes a rod 83 which is adapted to protrude into a protruding position in an energized state of the solenoid 84 and to retreat in a non-energized state of the solenoid 84. A tip end of the rod 83 is adapted to abut against the second cam 80. Moreover, a torsion spring 82 is mounted between the casing 78 and the second cam 80, and exhibits a spring force in a direction to push the second cam 80 against the tip end of the rod 83.

The solenoid 84 is brought into the energized state, when a vehicle speed exceeds, for example, 15 km/hr. In this state, the second cam 80 is turned against the spring force of the torsion spring 82 to a position in which the second cam 80 can be engaged with the first cam 79, by the rod 83 lying in the protruding position. When the turned position of the selecting lever 76 is the fifth/sixth-speed selecting position, the second cam 80 is engaged with the first and second abutment faces 79a and 79b of the first cam 79, thereby inhibiting the turning of the selecting lever 76 from the fifth/sixth-speed selecting position to the reverse position. In other words, in a state in which the vehicle speed exceeds, for example, 15 km/hr, the reverse position cannot be selected.

In this case, the solenoid 84 is positioned so that its operating axis is substantially perpendicular to a direction of a force which is applied from the first cam 79 to the second cam 80 upon the turning of the selecting lever 76 from the fifth/sixth-speed selecting position to the reverse position. Therefore, the force by turning of the selecting lever 76 from the fifth/sixth-speed selecting position to the reverse position cannot be applied to the solenoid 84. The solenoid 84 may be formed to exhibit a relatively small electromagnetic force.

In the case where the selecting lever 76 lying in the fifth/sixth-speed selecting position is turned to the third/fourth-speed selecting position when the vehicle speed exceeds, for example, 15 km/hr, the second cam 80 can be turned in a clockwise direction as viewed in FIG. 3, while the first cam 79 is pushing the rod 83 of the solenoid 84, that is, the turning of the selecting lever 76 from the fifth/sixth-speed selecting position toward the third/fourth-speed selecting position is permitted.

On the other hand, when the vehicle speed is a low speed, for example, equal to or lower than 15 km/hr, as well as when an ignition switch for the engine E is closed, the rod 83 is retracted by bringing the solenoid 84 into the non-energized state, and the second cam 80 is also turned, following the displacement of the rod 83, to a position in which it is not engaged with the first cam 79 (a position shown in a dashed line in FIG. 3). Therefore, when the turned position of the selecting lever 76 is the fifth/sixth-speed selecting position, the second cam 80 cannot be engaged with the first cam 79, that is, the turning of the selecting lever 76 from the fifth/sixth-speed selecting position to the reverse position is permitted.

A shifting lever 85 is fixed to the shift-selecting shaft 73 below the selecting lever 76 and adapted to be turned together with the shift-selecting shaft 74 in response to the operation of the change lever L in the shifting direction SH. When the change lever L is in the first/second-speed selecting position P1, the third/fourth-speed selecting position P2, the fifth/sixth-speed selecting position P3 or the reverse selection position P4, the shift-selecting shaft 73 is in the neutral position. The shift-selecting shaft 73 is turned in a counterclockwise direction as viewed in FIG. 4 from the neutral position in response to the operation of the change lever L to the first-speed position D1, the third-speed position D3 or the fifth-speed position D5, and turned in a clockwise direction as viewed in FIG. 4 from the neutral position in response to the operation of the change lever L to the second-speed position D2, the fourth-speed position D4, the sixth-speed position or the reverse position R.

Figure 5:
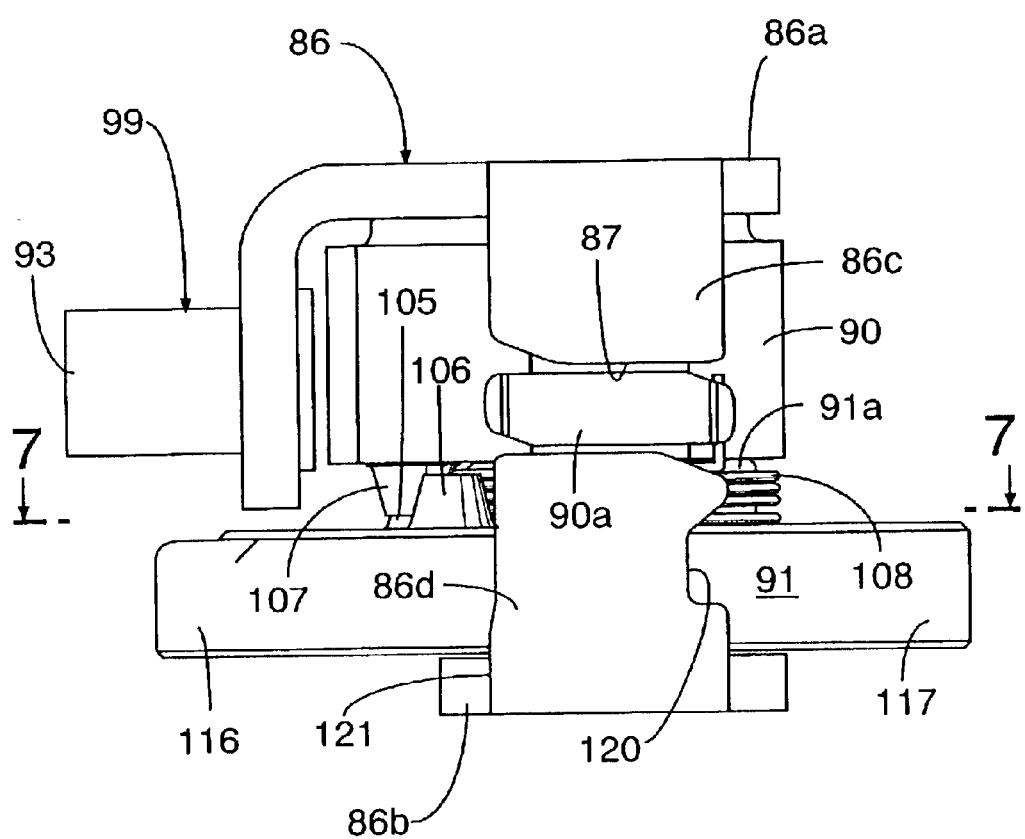
Figure 6:
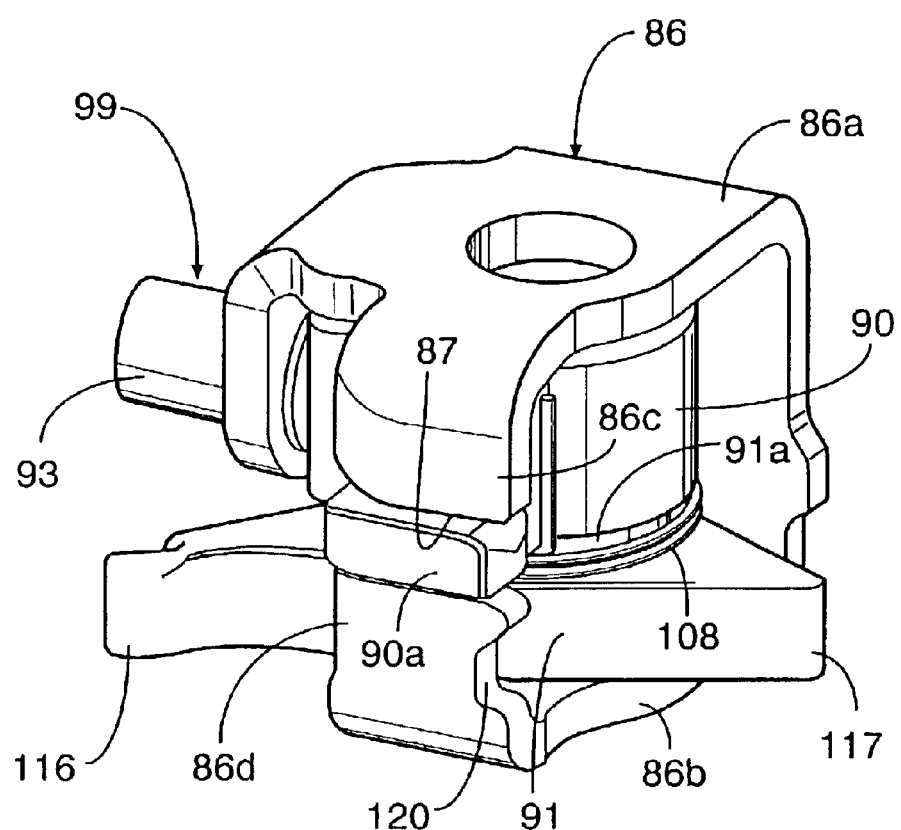

Referring also to FIGS. 5 and 6, an interlock plate 86 is mounted to the shift-selecting shaft 73. The interlock plate 86 includes a pair of upper and lower side plate portions 86a and 86b disposed at locations spaced apart from each other in an axial direction of the shift-selecting shaft 73 to extend through the shift-selecting shaft 73. A pair of locking claws 86c and 86d leading to the side plate portions 86a and 86b, respectively. A slit 87 is defined between the locking claws 86c and 86d to extend along a plane perpendicular to the axis of the shift-selecting shaft 73.

A guide groove 88 is provided in the interlock plate 86 to extend along the axis of the shift-selecting shaft 73, and a detent pin 89 is fixed to the left case half 13 of the transmission case 11 and fitted into the guide groove 88. Therefore, the movement of the interlock plate 86 in a direction along the axis of the shift-selecting shaft 73 is permitted, but the turning of the interlock plate 86 about the axis of the shift-selecting shaft 73 is inhibited.

A shifting arm 90 and an interlock arm 91 which is a first interlocking member are interposed between the side plate portions 86a and 86b of the interlock plate 86 in such a manner that a portion of each of the arms is covered with the interlock plate 86. The shift-selecting shaft 73 extends through the shifting arm 90 and the interlock arm 91. The shifting arm 90 is fixed to the shift-selecting shaft 73 by a bolt 92, and the interlock arm 91 is operatively connected to the shifting arm 90.

Provided between the shifting arm 90 and the interlock plate 86 is a detent mechanism 99 comprising a bottomed cylindrical retaining tube 93 mounted to the interlock plate 86 and having an axis perpendicular to the axis of the shift-selecting shaft 73, a ball 94 retained in the retaining tube 93 for movement in a direction along an axis of the retaining tube 93, a spring 95 mounted under compression between the retaining tube 93 and the ball 94 to exhibit a spring force for biasing the ball 94 toward the shifting arm 90, and recesses 96, 97 and 98 provided at three points spaced at equal distances apart from each other in a circumferential direction of the shifting arm 90, so that they can accommodate a portion of the ball 94.

The shifting arm 90 and the shift-selecting shaft 73 can be stopped with moderation by the detent mechanism 99 at three positions: any of the first-speed position, the third-speed position and the fifth-speed position; the neutral portion; and any of the second-speed position, the fourth-speed position, the sixth-speed position and the reverse position.

The shifting arm 90 has a drive portion 90a integrally provided thereon. The drive portion 90a is disposed in the slit 87 defined between the locking claws 86c and 86d of the interlock plate 86.

A first/second-speed shifting piece 101, a third/fourth-speed shifting piece 102, a fifth/sixth-speed shifting piece 103 and a reverse shifting piece 104 are arranged in the direction along the axis of the shift-selecting shaft 73. Tip ends of the shifting pieces 101 to 104 are formed into a substantially U-shape so that notches 101a, 102a, 103a and 104a are defined therein, respectively. These tip ends are disposed to sandwich the locking claws 86c and 86d of the interlock plate 86 from opposite sides, so that the drive portion 90a of the shifting arm 90 can be alternatively engaged into any of the notches 101a to 104a.

Referring carefully particularly to FIG. 3, a retainer 124 is in abutment against an upper surface of the interlock plate 86, more specifically, an upper surface of the side plate 86a, and a spring 125 is interposed between the retainer 124 and the cover member 71. The shift-selecting shaft 73 is provided with an annular step 73a facing the interlock plate 86, and a spring 127 is interposed between a spring-receiving plate 126 received on the step 73a and the retainer 124. Thus, in a state in which the shifting lever 85 is in the neutral position and no operating force is applied to the selecting lever 76, the selecting lever 76 is biased toward the third/fourth-speed position, and the change lever L is retained in the third/fourth-speed selecting position P2, by spring forces exhibited by the two springs 125 and 127 acting on the shift-selecting shaft 73.

Figure 7:
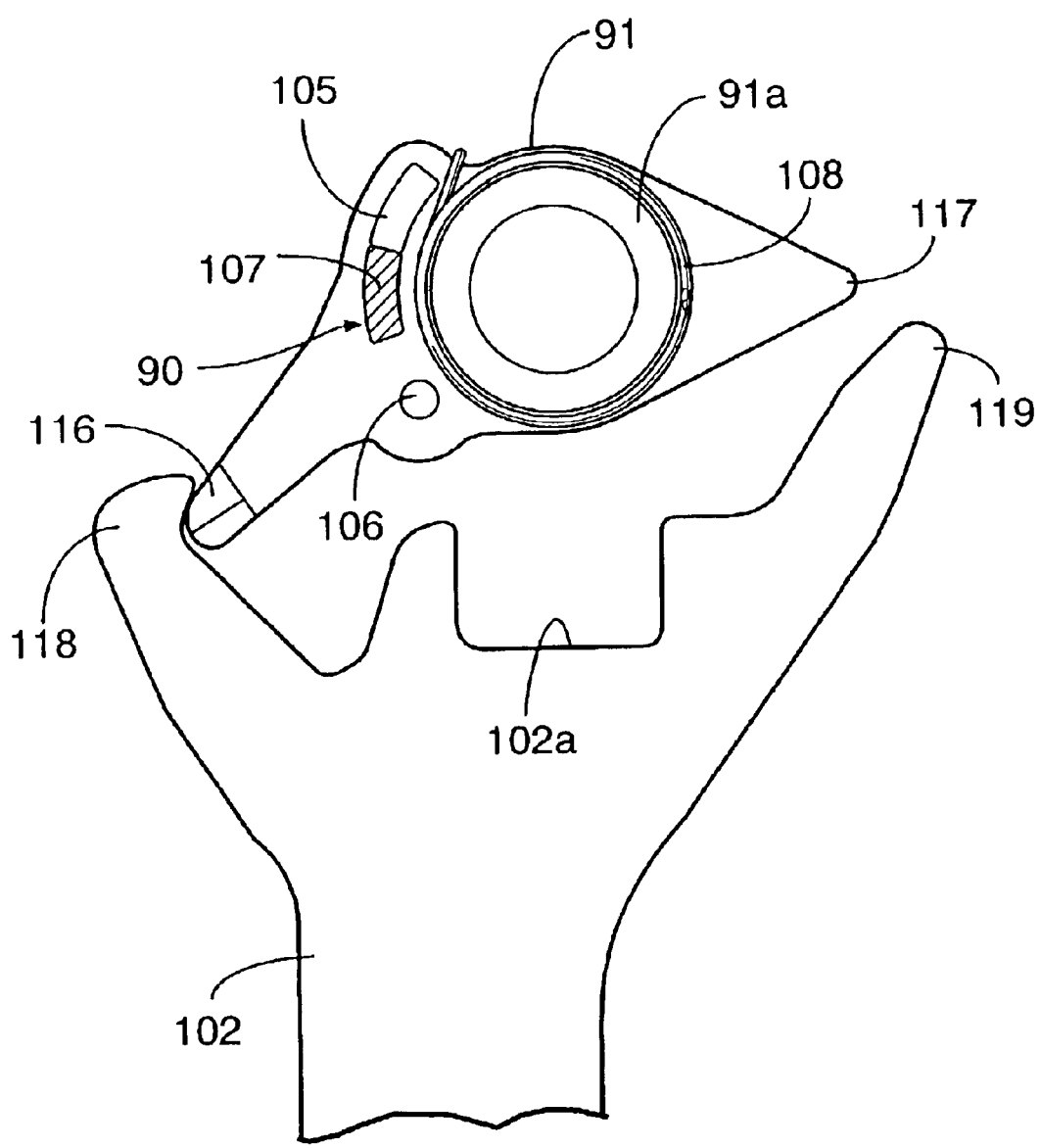

Referring also to FIG. 7, the interlock arm 91 is sandwiched between the shifting arm 90 and the side plate 86a of the interlock plate 86, and has a cylindrical portion 91a which is integrally provided thereon so that its tip end is sliding contact with the shifting arm 90, and through which the shift-selecting shaft 73 extends. First and second projections 105 and 106 are provided in the interlock arm 91 at locations spaced apart from each other in a circumferential direction of the shift-selecting shaft 73 outside the cylindrical portion 91a, and protrude toward the shifting arm 90. A projection 107 is provided in the shifting arm 90 at a location corresponding to between the projections 105 and 106 to protrude toward the interlock arm 91.

A torsion spring 108 is mounted between the shifting arm 90 and the interlock arm 91 to surround the cylindrical portion 91a of the interlock arm 91, and exhibits a spring force for biasing the shifting arm 90 and the interlock arm 91 in a direction to bring the projection 107 of the shifting arm 90 into engagement with the projection 105 of the interlock arm 91. Thus, when the shifting arm 90 is turned from the neutral position to any of the second-speed position, the fourth-speed position, the sixth-speed position and the reverse position as well as from any of the first-speed position, the third-speed position and the fifth-speed position to the neutral position, the interlock arm 91 is turned in operative association with the shifting arm 90 by pushing of the projection 105 pushed by the projection 107. When the shifting arm 90 is turned from any of the second-speed position, the fourth-speed position, the sixth-speed position and the reverse position to the neutral position as well as from the neutral portion to any of the first-speed position, the third-speed position and the fifth-speed position, the interlock arm 91 is turned in operative association with the shifting arm 90 by the spring force of the torsion spring 108.

The first/second-speed shifting piece 101 is fixed to a first/second-speed shifting rod (not shown) which is supported in the transmission case 11 for movement in a direction parallel to the axis of the counter shaft SC and which includes the first/second-speed shifting fork 50. The third/fourth-speed shifting piece 102 is fixed to a third/fourth-speed shifting rod 110 which is supported in the transmission case 11 for movement in a direction parallel to the axis of the main shaft SM and which includes the third/fourth-speed shifting fork 52. The fifth/sixth-speed shifting piece 103 is fixed to a fifth/sixth-speed shifting rod 111 which is supported on the transmission case 11 for movement in the direction parallel to the axis of the main shaft SM and which includes the fifth/sixth-speed shifting fork 54.

The reverse shift piece 104 is fixed to a reverse shifting rod 112 supported in the transmission case 11 for movement in a direction parallel to the axis of the reverse idling shaft SR. On the other hand, the reverse shifting fork 55 is turnably carried on a support plate 113 fixed to the right case half 12 of the transmission case 11 through a shaft 114 parallel to the shift-selecting shaft 73. A drive arm 115 integrally formed on the reverse shifting piece 104 is engaged with the reverse shifting fork 55 in such a manner that it turns the reverse shifting fork 55 in response to the operation of the reverse shifting piece 104 together with the reverse shifting rod 112.

The interlock arm 91 functions in the following manner: When the interlock arm 91 is turned for shifting in operative association with the turning of the shifting arm 90 caused with the operation for shifting to the reverse position, it drives the a preselected forward speed stage shifting piece, e.g., the third/fourth-speed shifting piece 102 by a predetermined amount at a initial stage of such shifting turning, and returns the third/fourth-speed shifting piece 102 to its original position at a final stage of the shifting turning. In this manner, the reverse speed stage is established, while preventing the generation of a gear chattering, by temporarily braking the main shaft SM.

The interlock arm 91 is integrally provided with first and second drive arm portions 116 and 117 overhanging outwards at locations spaced apart from each other in the circumferential direction of the shift-selecting shaft 73. The third/fourth-speed shifting piece 102 is integrally provided with a first engagement arm portion 118 capable of being brought into engagement with the first drive arm portion 116, and a second engagement arm portion 119 capable of being-brought into engagement with the second drive arm portion 117, and the notch 102a is sandwiched between the first and second engagement arm portions 118 and 119.

The first drive arm portion 116 is formed so that it can be brought into engagement with the first engagement arm portion 119 from the side of the notch 102a with the selecting movements of the shifting arm 90 and the interlock arm 91 in response to the operation of the change lever L lying in the neutral position to the reverse selecting position P4. The second drive arm portion 117 is formed so that it can be brought into engagement with the second engagement arm portion 119 from the side of the notch 102a with the shifting of the shifting arm 90 and the interlock arm 91 in response to the operation of the change lever L to the reverse position R in the reverse selecting position P4.

Figure 8A:
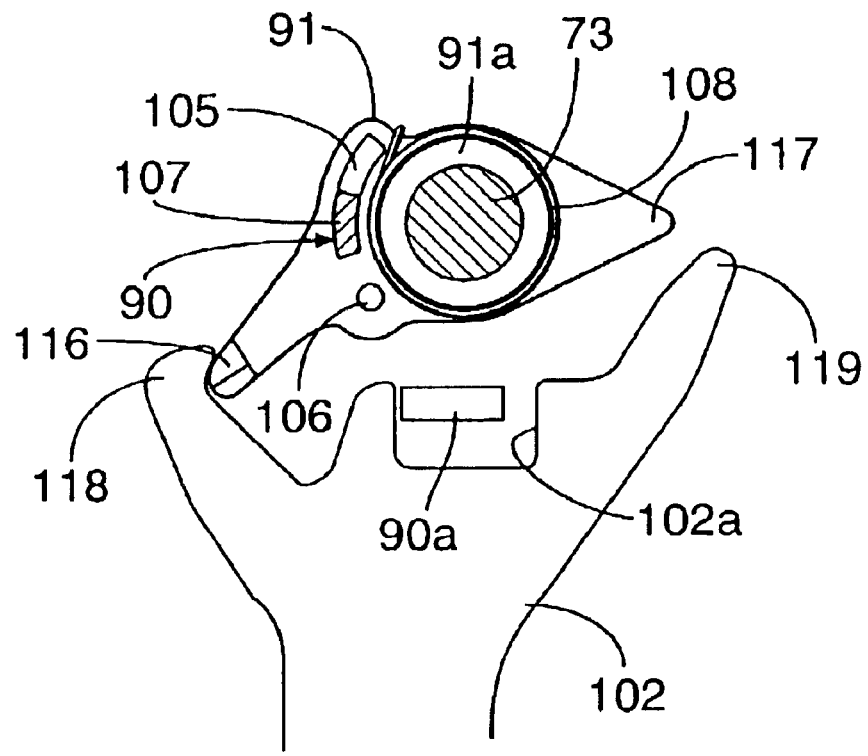
FIG. 8A is a view showing relative positions of the interlock arm and the third/fourth-speed shifting piece in a reverse selecting position.
Figure 8B:
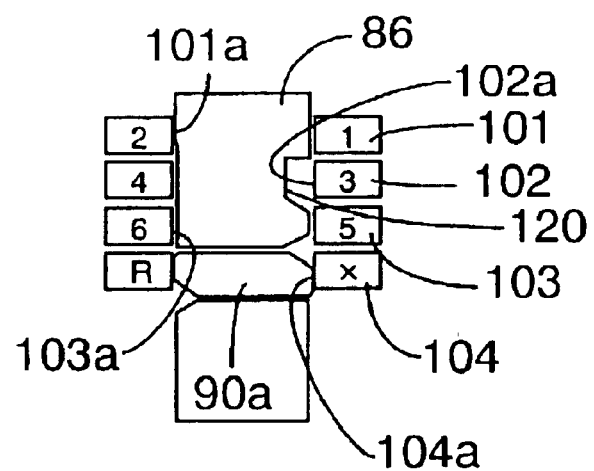
FIG. 8B is a view showing relative positions of the interlock plate, the shifting arm and each of shifting pieces in the reverse selecting position.

When the change lever L is brought into the reverse selecting position P4, the first drive arm portion 116 is brought into engagement with the first engagement arm portion 118, as shown in FIG. 8A. At this time, the drive portion 90a of the shifting arm 90 is in a position corresponding to the reverse shifting piece 104, as shown in FIG. 8B.

Figure 9A:
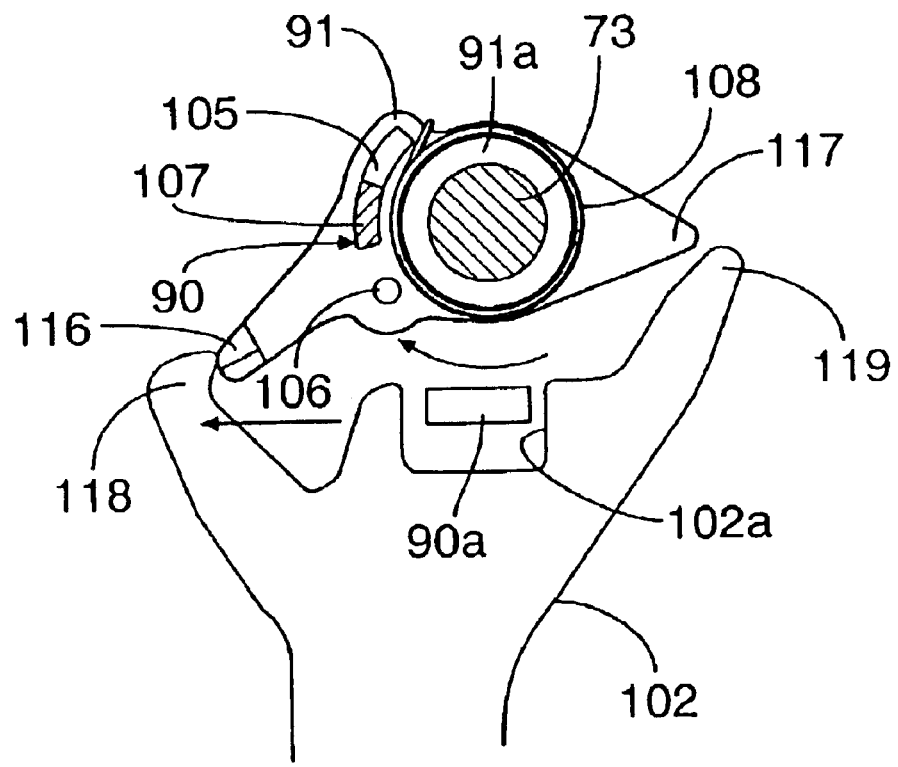
FIG. 9A is a view showing the relative positions of the interlock arm and the third/fourth-speed shifting piece at an initial stage of a shifting operation to a reverse position.
Figure 9B:
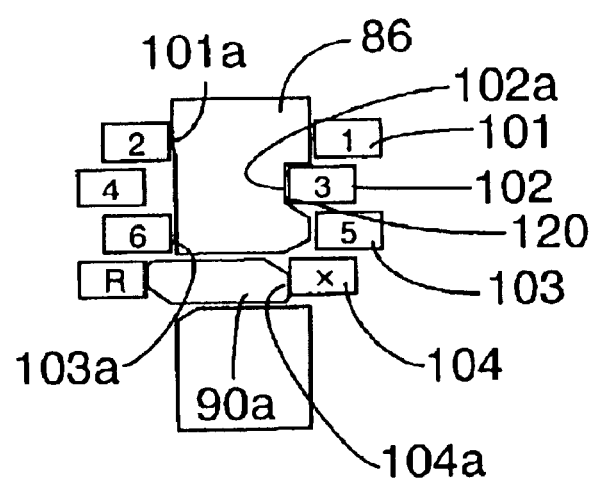
FIG. 9B is a view showing the relative positions of the interlock plate, the shifting arm and each of the shifting pieces at the initial stage.

When the change lever L is operated for shifting to the reverse position R in the reverse selecting position P4, the first engagement portion 118 is pushed at an initial stage of such shifting operation by the first drive arm portion 116 with the turning of the interlock arm 91, as shown in FIG. 9A, whereby the third/fourth-speed shifting piece 102 is pushed by a predetermined amount toward the fourth-speed position, as shown in FIG. 9B. In order to ensure the movement of the third/fourth-speed shifting piece 102 toward the fourth-speed position in this case, the interlock plate 86 is provided with a recess 120 which accommodates a portion of the third/fourth-speed shifting piece 102 driven by the predetermined amount.

Figure 10A:
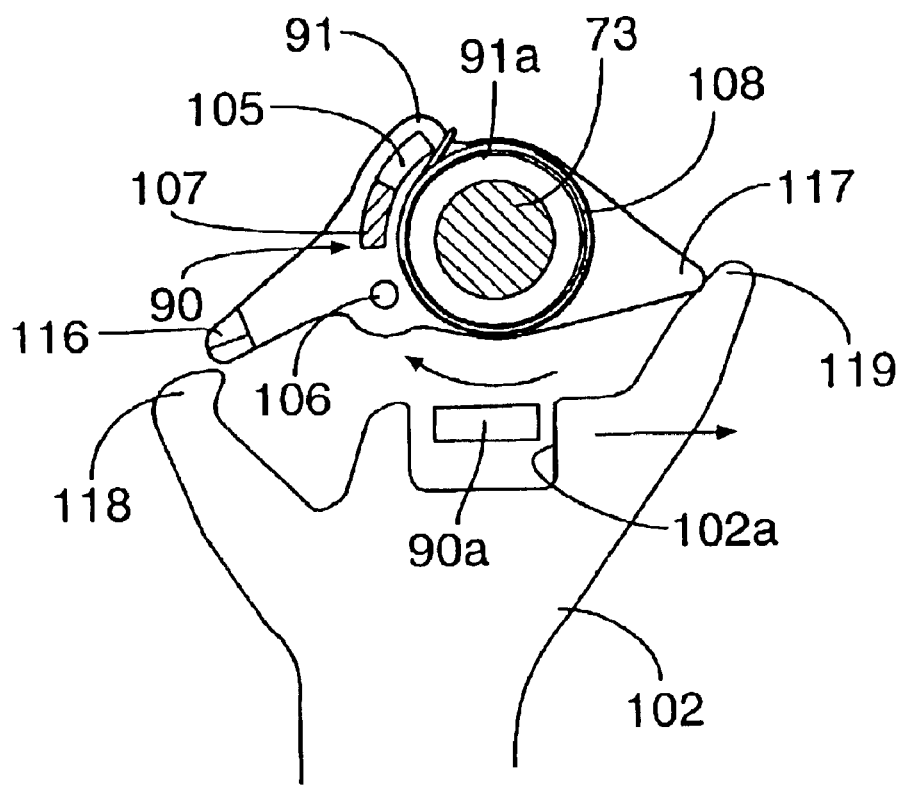
FIG. 10A is a view showing the relative positions of the interlock arm and the third/fourth-speed shifting piece in the middle of the shifting operation to the reverse position.
Figure 10B:
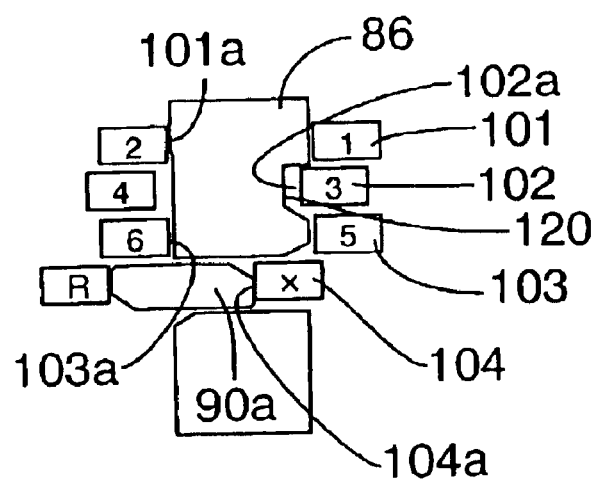
FIG. 10B is a view showing the relative positions of the interlock plate, the shifting arm and each of the shifting pieces in the middle of the shifting operation to the reverse position.

When the shifting operation of the change lever L further progresses, the engagement of the first drive arm portion 116 with the first engagement arm portion 118 is released, as shown in FIG. 10A, and the application of an urging force from the first drive arm portion 116 to the third/fourth-speed shifting piece 102 is released. On the other hand, the second drive arm portion 117 is brought into engagement with the second engagement arm portion 119 from the side of the notch 102a, and the second engagement arm portion 119 is pushed by the second drive arm portion 117 with the shifting of the interlock arm 91 toward the reverse position. This causes the third/fourth-speed shifting piece 102 to be returned from the fourth-speed position to the neutral position, as shown in FIG. 10B.

Figure 11A:
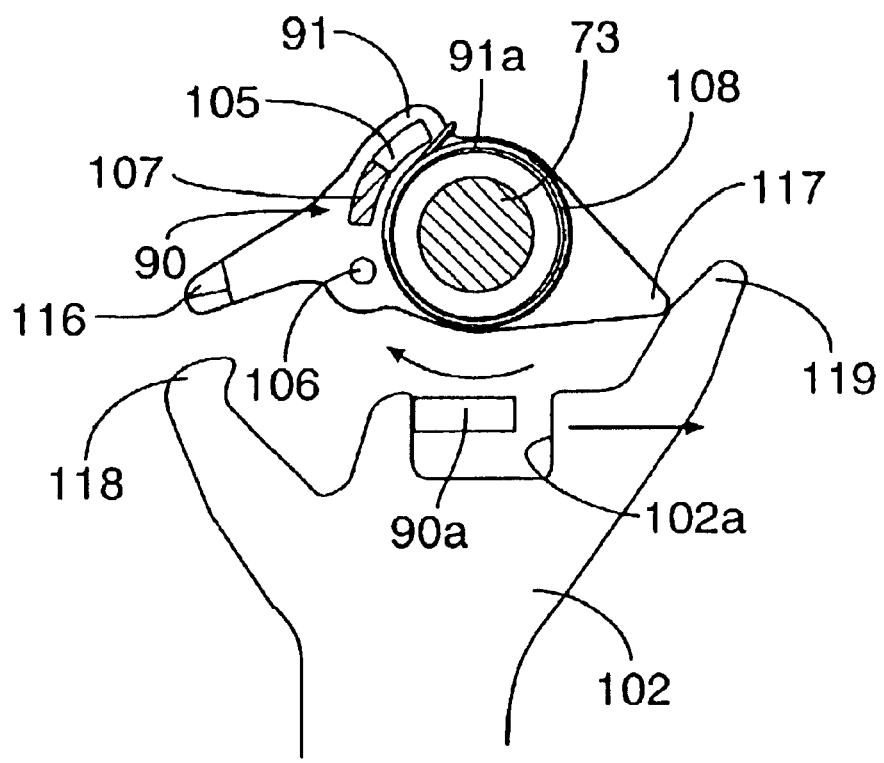
FIG. 11A is a view showing the relative positions of the interlock arm and the third/fourth-speed shifting piece upon the completion of the shifting operation to the reverse position.
Figure 11B:
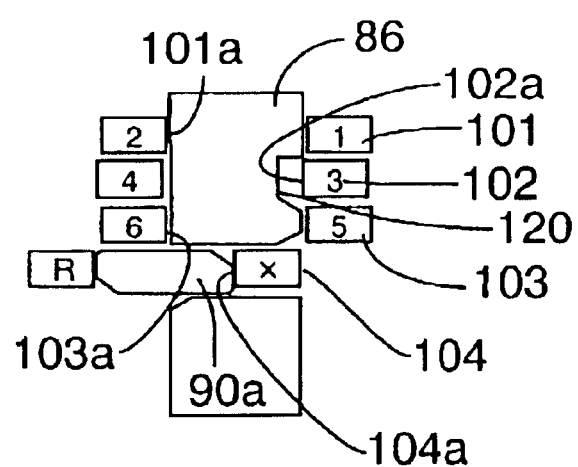
FIG. 11B is a view showing the relative positions of the interlock plate, the shifting arm and each of the shifting pieces in the middle of the shifting operation to the reverse position upon the completion of the shifting operation to the reverse position.

At a final stage of the shifting operation of the change lever L toward the reverse position R, the second engagement arm portion 119 is further pushed by the second drive arm portion 117, as shown in FIG. 11A, and the third/fourth-speed shifting piece 102 is returned to the neutral position, as shown in FIG. 11B.

Figure 12A:
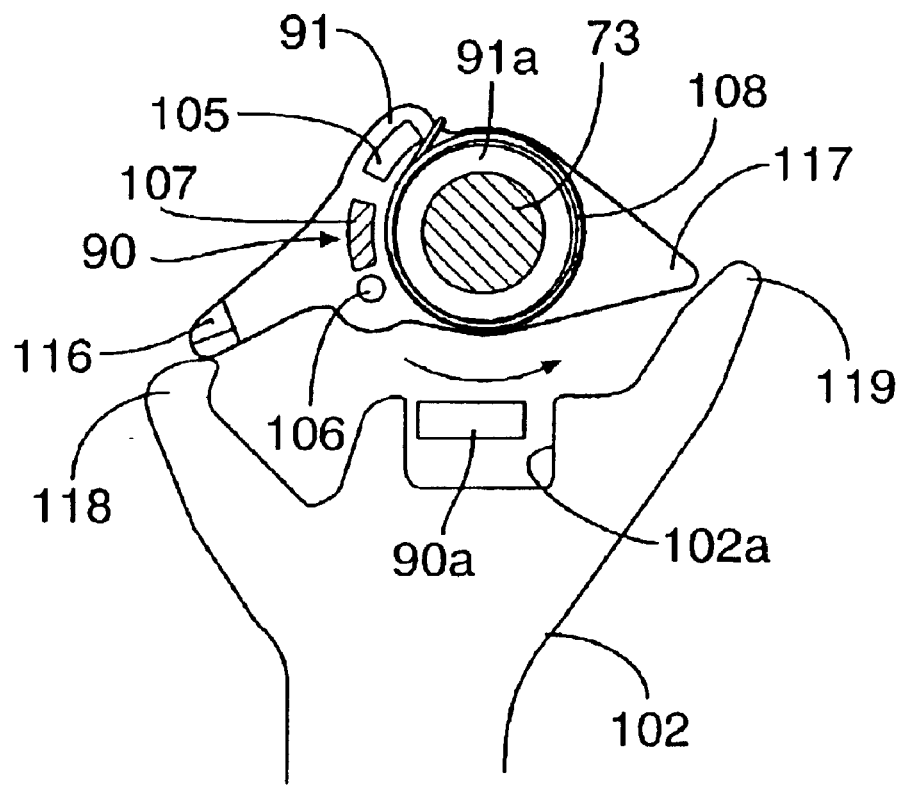
FIG. 12A is a view showing the relative positions of the interlock arm and the third/fourth-speed shifting piece upon the completion of the shifting operation from the reverse position to a neutral position.
Figure 12B:
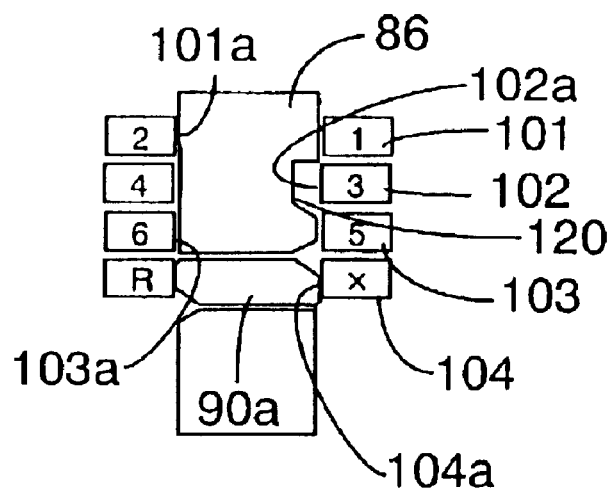
FIG. 12B is a view showing the relative positions of the interlock plate, the shifting arm and each of the shifting pieces upon the completion of a shifting operation from the reverse position to the neutral position.
Figure 13A:
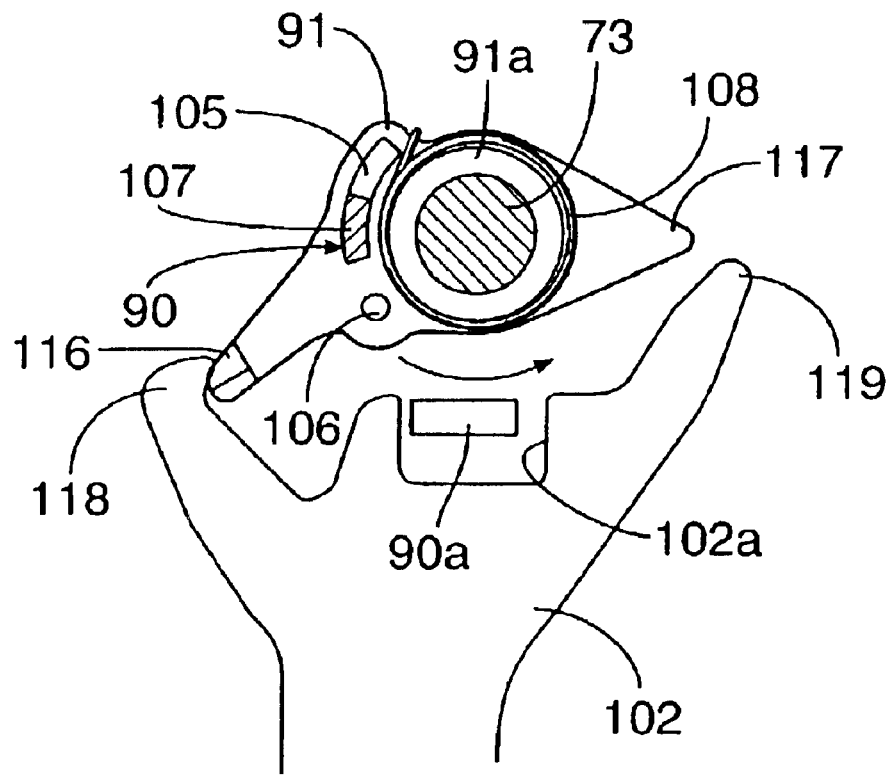
FIG. 13A is a view showing the relative positions of the interlock arm and the third/fourth-speed shifting piece when the shifting arm has been returned to a third/fourth-speed selecting position in the neutral position.
Figure 13B:
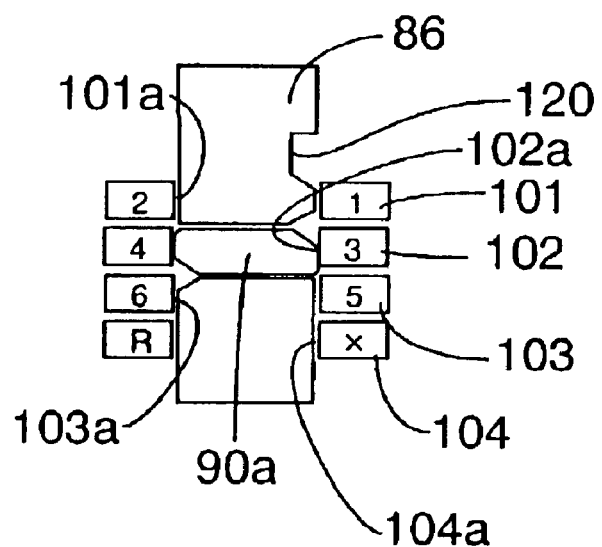
FIG. 13B is a view showing the relative positions of the interlock plate, the shifting arm and each of the shifting pieces when the shifting arm has been returned to the third/fourth-speed selecting position in the neutral position.

When the change lever L is further operated for shifting from the reverse position R toward the neutral position, the first drive arm portion 116 is put into abutment against the first engagement arm portion 118 from outside, as shown in FIG. 12A, whereby the turning of the interlock arm 91 is inhibited. Therefore, the shifting arm 90 is turned with the interlock arm 91 left as it is, while compressing the torsion spring 108, so that the drive portion 90a of the shifting arm 90 is returned to the neutral position, as shown in FIG. 12B.

When the change lever L is then returned from the reverse selecting position P4 to the third/fourth-speed selecting position P2, the abutment of the first drive arm portion 116 against the first engagement arm portion 118 is released, whereby the interlock arm 91 is turned until the projection 105 is put into abutment against the projection 107 by the spring force of the torsion spring 108. In this manner, the interlock arm 91 is returned to a state before the start of the reverse shifting operation.

After the main shaft SM is once braked as described above to establish the reverse speed stage, there starts the simultaneous meshing of the reverse idling gear 46 slidable in a direction parallel to the main shaft SM and the counter shaft SC with the counter reverse gear 48 provided on the sleeve 49 of the first/second-speed synchronizing mechanism S and the main reverse gear 47 secured to the main shaft SM. However, if the sleeve 49 is moved with the sliding meshing of the reverse idling gear 46 with the counter reverse gear 48, it is difficult for the main shaft SM to be rotated by the function of the first/second-speed synchronizing mechanism S1, and a thrust load provided upon the meshing of the reverse idling gear 46 with the main reverse gear 47 is increased.

Figure 14A:
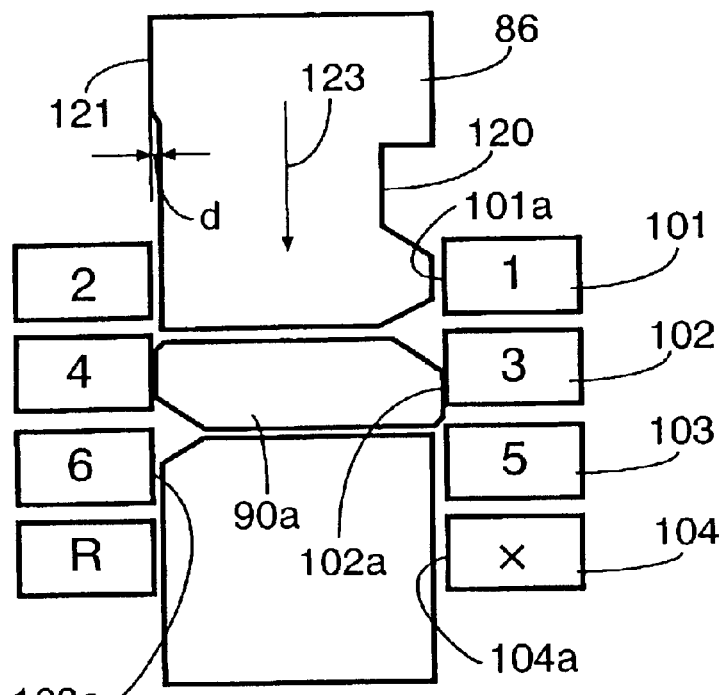
FIG. 14A is a view showing the relative positions of the interlock plate, the shifting arm and each of the shifting pieces when the shifting arm is in the third/fourth-speed selecting position in the neutral position, and FIG. 14B a view showing the relative positions of the interlock plate, the shifting arm and each of the shifting pieces when the shifting arm has been moved to a reverse selecting position in the neutral position.
Figure 14B:
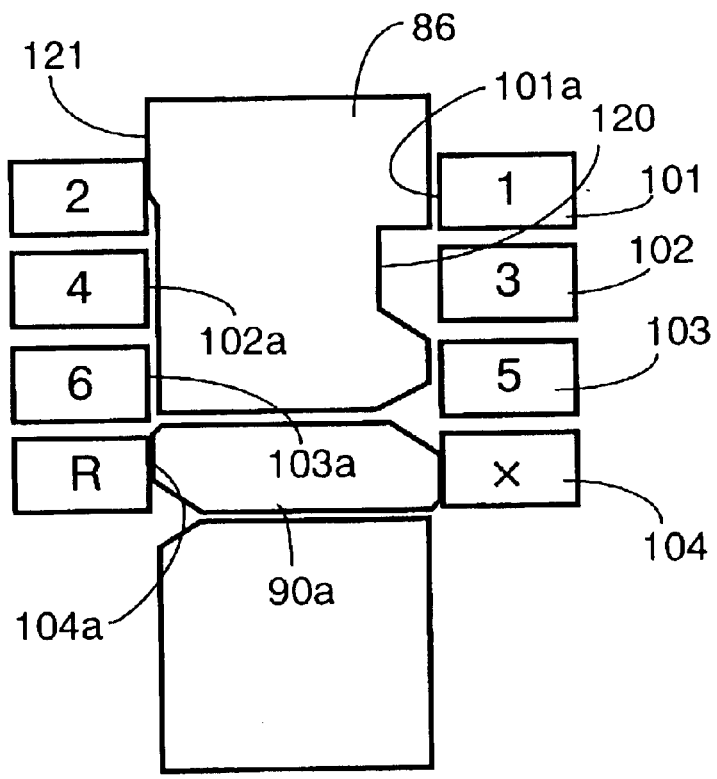

Therefore, a restricting face 121 is formed at an end of the interlock plate 86 opposite from an operational direction 123 of the interlock plate 86 with the selecting operation of the change lever L toward the reverse position R, as shown in FIG. 14. The restricting face 121 is formed in such a manner that among side faces of the interlock plate 86 facing the second-speed position, the fourth-speed position, the sixth-speed position and the reverse position, one side at the end opposite from the operational direction 123 protrudes by a protrusion amount d from the remaining side faces. When the drive portion 90a of the shifting arm 90 is in one of positions corresponding to the shifting pieces 101, 102 and 103 other than the reverse shifting piece 104, as shown in FIG. 14A, the restricting face 121 is not opposed to any of the shifting pieces 101 to 104. However, when the shifting arm 90 is driven for selection to a position where the drive portion 90a is opposed to the reverse shifting arm 104, as shown in FIG. 14B, the restricting face 121 is opposed with a very small gap to one of side faces of the notch 101a in the first/second-speed shifting piece 101, which is on the side of the second-speed position.

Therefore, even if a force toward the counter first-speed gear 40 is applied to the sleeve 49 provided with the counter reverse gear 48 in response to the sliding meshing of the reverse idling gear 46 with the counter reverse gear 48 caused with the shifting operation of the shifting arm 90 toward the reverse position, the movement of the sleeve 49 retained by the first/second-speed shifting fork 50 toward the counter first-speed gear 40 is inhibited, because the movement of the first/second-speed shifting fork 50 operatively connected to the first/second-speed shifting piece 101 by the abutment of the first/second-speed shifting piece 101 against the restricting face 121.

Figure 15:
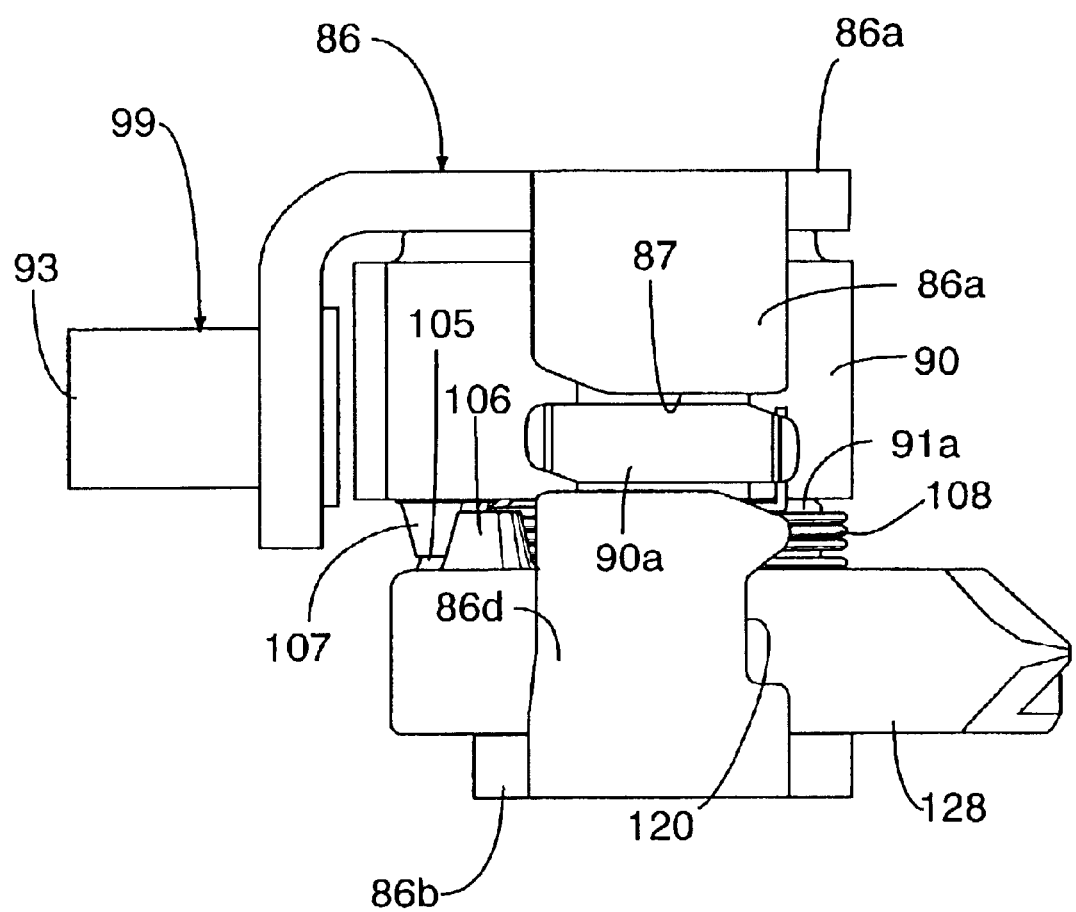

In the manual transmission having six forward speed stages, the shifting arm 90 and the interlock arm 91 operatively connected to the shifting arm 90 are interposed between the side plate portions 86a and 86b of the interlock plate 86, as described above, but in a manual transmission having an even number of, e.g., five forward stages, a shifting arm 90 and a reverse locking cam member 128 as a second interlock member having a shape different from that of the interlock arm 91 and operatively connected to the shifting arm 90 are interposed between the side plate portions 86a and 86b of the interlock plate 86, as shown in FIG. 15.

The reverse locking cam member 128 is adapted to prevent the mis-operation by inhibiting the turning of the shifting arm 90 from a fifth-speed position which is a forward highest-speed position to the reverse position. The reverse locking cam member 128 is operatively connected to the shifting arm 90 in an operative-connection structure similar to the operative-connection structure between the shifting arm 90 and the interlock arm 91 in the manual transmission having six forward six speed stages.

The interlock 91 and the reverse locking cam member 128 having different shapes are prepared in advance, and any of a combination of the shifting arm 90 and the interlock arm 91 and a combination of the shifting arm 90 and the reverse locking cam member 128 can be alternatively selected whether the manual transmission is of the six forward speed stages or of the five forward speed stages.

The operation of the present embodiment will be described below. In the case of the manual transmission having the six forward speed stages, the shifting arm 90 and the interlock arm 91 operatively connected to the shifting arm 90 are interposed between the pair of side plate portions 86a and 86b of the interlock plate 86 mounted to the shift-selecting shaft 73. In the case of the manual transmission having the five forward speed stages, the shifting arm 90 and the reverse locking cam member 128 operatively connected to the shifting arm 90 are interposed between the side plate portions 86a and 86b.

Therefore, a reduction in cost can be achieved by having the shifting arm for common use in the changing systems of a plurality of manual transmissions having different numbers of forward speed stages. Moreover, either one of the interlock arm 91 and the reverse locking cam member 128 each having a shape depending on the number of the forward speed stages is selected depending on the number of the forward speed stages and operatively connected to the shifting arm 90. Therefore, it is possible to prevent an increase in weight due to an unnecessary portion remaining in the shifting arm 90, since a function required for the shifting arm 90 is performed by any of the interlock arm 91 and the reverse locking cam member 128 in such a manner that it is selected depending on the number of the forward speed stages.

The interlock arm 91 used in the manual transmission having the six forward speed stages is operated to establish the reverse speed stage, and the reverse locking cam member 128 used in the manual transmission having the five forward speed stages functions to prevent the turning of the shifting arm 90 from the neutral position to the reverse position. Either the interlock arm 91 or the reverse locking cam member 128 is alternatively selected depending on whether the number of the forward speed stages is an even number or an odd number. Therefore, a satisfactory function can be exhibited in each of the changing systems in appropriate correspondence to the number of the forward speed stages.

In addition, the interlock arm 91 functions to drive, by a predetermined amount, the third/fourth-speed shifting piece 102 at a preselected forward speed stage at an initial stage of the shifting operation to the reverse position, and to return the third/fourth-speed shifting piece 102 to the original position at a final stage of the shifting operation. When the shifting arm 90 is driven for shifting toward the reverse position, the main shaft SM is braked, as when the third/fourth-speed shifting piece 102 establishes the third speed stage, and the braking of the main shaft SM is released at the final stage of the shifting operation.

Therefore, an exclusive mechanism for the reverse speed stage is not required, and the main shaft SM can be braked temporarily during establishment of the reverse speed stage to prevent the generation of a gear chattering. Additionally, it is possible to provide the compactness of the manual transmission in the direction along the axis of the main shaft SM and to provide a reduction in weight of the manual transmission by a value corresponding to that the exclusive mechanism is not required.

Moreover, the recess 120 is provided in the interlock plate 86 for accommodation of a portion of the third/fourth-speed shifting piece 102 driven by the predetermined amount at the initial stage of the shifting operation and hence, the braking of the main shaft SM can be achieved reliably by ensuring that the third/fourth-speed shifting piece 102 is driven reliably by the predetermined amount during the establishment of the reverse speed stage.

Further, the interlock plate 86 is formed into a shape such that when the shifting arm 90 having the drive portion 90a engaged with the reverse shifting piece 104 is turned for shifting to establish the reverse speed stage, the movement of the first/second-speed shifting piece 101 in the same direction as a direction of sliding movement of the reverse idling gear 46 is inhibited. Therefore, the movement of the first/second-speed shifting piece 101 in the same direction as a direction of sliding movement of the reverse idling gear 46 is inhibited by the interlock plate 68, when the shifting arm 90 is turned for shifting toward the reverse position in order to establish the reverse speed stage. Thus, even if a force for moving the sleeve 49 of the first/second speed synchronizing mechanism S1 is applied to the sleeve 49 when the reverse idling gear 46 is brought into sliding engagement with the counter reverse gear 48, the sleeve 49 cannot be moved, because the movement of the first/second-speed shifting piece 101 operatively connected to the first/second-speed shifting fork 50 retaining the sleeve 49 is inhibited. As a result, in the starting of the simultaneous engagement of the reverse idling gear 46 with the counter reverse gear 48 and the main reverse gear 47 after the main shaft SM is once braked, the synchronizing effect of the first/second-speed synchronizing mechanism S1 ensures that such a phenomenon deteriorating the rotation of the main shaft SM cannot occur, and a thrust load provided upon the meshing of the reverse idling gear 46 with the main reverse gear 47 cannot be increased, so that the reverse shifting load can be reduced.

Although the embodiment of the present invention has been described in detail, it will be understood that the present invention is not limited to the above-described embodiment, and various modifications in design may be made without departing from the spirit and scope of the invention defined in the claims.

What is claimed is:

1. A changing system in a manual transmission in which an interlock plate is mounted on a shift-selecting shaft capable of being moved axially in response to a selecting operation and turned about an axis in response to a shifting operation, so that the interlock plate cannot be turned about the axis of the shift-selecting shaft, said interlock plate having a pair of side plate portions which are provided at locations spaced apart from each other in the direction of the axis of said shift-selecting shaft and through which said shift-selecting shaft extends, and a shifting arm disposed between said side plate portions is fixed to said shift-selecting shaft, wherein the shifting arm and an interlock member separate from but operatively connected to said shifting arm and provided on the shift-selecting shaft are interposed between said side plate portions of said interlock plate.

2. A changing system in a manual transmission according to claim 1, wherein as said interlock member, a first interlock member operated to establish a reverse speed stage and a second interlock member functioning to prevent the turning of said shifting arm from a forward highest-speed stage to the reverse speed stage are provided in advance for manual transmissions and one of said first and second interlock members is selected alternatively for a selected one of the manual transmissions depending on the number of forward speed stages in such a manner that said first interlock member is selected when the number of forward speed stages is an even number, and said second interlock member is selected when the number of forward speed stages is an odd number.

3. A changing system in a manual transmission according to claim 2, wherein a plurality of shifting pieces are disposed in parallel in a direction along the axis of said shift-selecting shaft and capable of being alternatively brought into engagement with said shifting arm depending on the selecting operation, and said first interlock member is operatively connected to said shifting arm in such a manner that preselected one of said forward speed stage shifting pieces is driven by a predetermined amount at an initial stage of a shifting operation to a reverse position and returned to an original position at a final stage of the shifting operation.

4. A changing system in a manual transmission according to claim 3, wherein said interlock plate capable of being moved in the axial direction of said shift-selecting shaft and incapable of being turned about an axis is mounted to said shift-selecting shall to cover a portion of said interlock arm and a portion of said first interlock member, and said interlock plate is provided with a recess adapted to accommodate a portion of said preselected forward speed stage shifting piece driven by the predetermined amount at said initial stage of the shifting operation.

5. A changing system in a manual transmission according to claim 1, wherein said interlock member is mounted on said shift-selecting shaft with an axial spacing between the interlock member and the shifting arm with a spring interposed therebetween.

6. A changing system in a manual transmission according to claim 5, wherein projections are formed on opposing faces of the interlock member and the shifting arm respectively.

* * * * *